(12) United States Patent
Sonney et al.

(10) Patent No.: US 11,359,369 B2
(45) Date of Patent: Jun. 14, 2022

(54) DEVICE AND PROCESS FOR THERMAL ISOLATION OF TECHNICAL ELEMENTS

(71) Applicant: Easy Technic SA, Bulle (CH)

(72) Inventors: Nicolas Sonney, Grattavache (CH); Laurent Guillet, Vuadens (CH)

(73) Assignee: Easy Technic SA, Bulle (CH)

( * ) Notice: Subject to any disclaimer, the term of this patent is extended or adjusted under 35 U.S.C. 154(b) by 0 days.

(21) Appl. No.: 16/842,428

(22) Filed: Apr. 7, 2020

(65) Prior Publication Data

US 2020/0325677 A1 Oct. 15, 2020

(30) Foreign Application Priority Data

Apr. 12, 2019 (CH) .................. CH00499/19
May 17, 2019 (CH) .................. CH00643/19

(51) Int. Cl.

| | |
|---|---|
| *E04B 1/94* | (2006.01) |
| *H02G 3/22* | (2006.01) |
| *H02G 3/04* | (2006.01) |
| *E04G 15/06* | (2006.01) |
| *E04B 2/74* | (2006.01) |
| *A62C 2/06* | (2006.01) |
| *A62C 99/00* | (2010.01) |

(Continued)

(52) U.S. Cl.
CPC .............. *E04B 1/941* (2013.01); *E04B 1/948* (2013.01); *E04B 2/7411* (2013.01); *E04G 15/061* (2013.01); *H02G 3/0412* (2013.01); *H02G 3/22* (2013.01); *A62C 2/06* (2013.01); *A62C 99/0045* (2013.01); *F16L 5/04* (2013.01); *F16L 59/145* (2013.01)

(58) Field of Classification Search
CPC ........ E04B 1/941; E04B 1/948; E04B 2/7411; A62C 2/06; A62C 99/0045; H02G 3/22; H02G 3/0412; F16L 59/145; F16L 5/04; E04G 15/061
USPC .................................. 52/317, 396.01, 404.1
See application file for complete search history.

(56) References Cited

U.S. PATENT DOCUMENTS

| | | | | |
|---|---|---|---|---|
| 5,174,077 A | * | 12/1992 | Murota | ..................... F16L 5/04 |
| | | | | 52/220.8 |
| 8,857,528 B2 | * | 10/2014 | Lee | ........................... F16L 5/04 |
| | | | | 169/48 |
| 11,072,924 B2 | * | 7/2021 | Albers | ................. H02G 3/0412 |

(Continued)

FOREIGN PATENT DOCUMENTS

| | | | | |
|---|---|---|---|---|
| CA | 2717457 A1 | * | 9/2009 | ............. E04B 1/942 |
| DE | 2165253 A1 | * | 7/1973 | ........... E04G 15/061 |

(Continued)

OTHER PUBLICATIONS

International Search Report for CH4992019, dated Jun. 4, 2019, 3 pages.

*Primary Examiner* — Brent W Herring
(74) *Attorney, Agent, or Firm* — Blank Rome LLP

(57) ABSTRACT

Process for fire resistant protection of the technical elements of a building by means of one or more prefabricated isolation blocks, enabling pre-isolation of a vacant space in the structure of a building. The block comprises an easily modelled fire resistant material and is disposed before pouring the concrete of the structure of the building. The prefabricated block is then opened up in such a manner as to install the technical elements having to be protected from fire.

13 Claims, 3 Drawing Sheets

(51) Int. Cl.
  *F16L 5/04* (2006.01)
  *F16L 59/14* (2006.01)

(56) References Cited

U.S. PATENT DOCUMENTS

| | | | | |
|---|---|---|---|---|
| 2007/0289235 A1* | 12/2007 | Hansen | ................ | H02G 3/0412 |
| | | | | 52/309.7 |
| 2011/0056163 A1* | 3/2011 | Kure | ....................... | E04B 1/944 |
| | | | | 52/741.3 |
| 2011/0088917 A1* | 4/2011 | Lee | ........................... | F16L 5/14 |
| | | | | 169/45 |
| 2016/0090738 A1 | 3/2016 | de Freitas Silvestre | | |
| 2018/0345059 A1* | 12/2018 | Hulteen | ................... | A62C 3/10 |
| 2020/0115896 A1* | 4/2020 | Albers | .................... | F16L 57/04 |

FOREIGN PATENT DOCUMENTS

| | | | | |
|---|---|---|---|---|
| DE | 19649958 A1 * | 6/1998 | ........... | E04G 15/061 |
| DE | 10108316 A1 * | 12/2001 | ................ | F16L 5/04 |
| DE | 102004029256 A1 | 1/2006 | | |
| DE | 102017213613 A1 | 2/2019 | | |
| EP | 2260153 B1 * | 1/2015 | ............. | E04B 1/942 |
| KR | 101940606 B1 | 1/2019 | | |
| WO | WO-0052278 A1 * | 9/2000 | ................ | F16L 5/04 |
| WO | WO-2009109195 A2 * | 9/2009 | ........... | E04B 1/942 |
| WO | WO-2012059221 A * | 5/2012 | ................ | F16L 5/04 |
| WO | WO-2013011244 A1 * | 1/2013 | ................ | H02G 3/22 |
| WO | WO-2018114162 A1 * | 6/2018 | ............... | H02G 3/22 |

\* cited by examiner

DEVICE AND PROCESS FOR THERMAL ISOLATION OF TECHNICAL ELEMENTS

RELATED APPLICATIONS

This application claims the benefit of Switzerland Application No. CH00499/19, filed on Apr. 12, 2019 and Switzerland Application No. CH00643/19, filed on May 17, 2019. The entire contents of those applications are hereby incorporated by reference.

TECHNICAL FIELD

The present invention concerns the thermal isolation of the technical elements of a building and in particular their fire isolation. The present description refers in particular to an isolation block comprising a fire retardant material together with a process of fire retardant isolation of the technical elements to be incorporated in the building.

PRIOR ART

The concrete structures of buildings under construction are traditionally poured in their entirety without taking account of possible passages of technical elements such as ducts or pipework. This practice necessitates drilling the concrete afterwards to house therein the technical elements indispensable to the operation of the building. This requires time and effort, which compromises lead times and construction costs.

Moreover, when the passages are formed in the concrete structure, it is usual to isolate the technical elements after installing them by inserting a fire retardant material into the remaining space. The installation of the fire retardant material afterwards may be made difficult for reasons of overall size or of ease of access. The isolation operation is then delicate and may not lead to optimum protection.

According to the traditional practices, the piercings of the concrete structures are protected by wood or duckboard panels screwed to the concrete, pending the installation of the technical elements, in such a manner as to prevent accidents to personnel. This operation takes time in the production of the structure.

It is therefore necessary to improve the process to make it possible to reduce construction times and costs whilst improving the quality of the protection against fires.

SUMMARY OF THE INVENTION

The present invention aims to alleviate these difficulties. The present invention covers in particular a process of fire retardant protection of the technical elements of a building by means of a prefabricated isolation block. The isolation block comprises or consists of fire retardant material.

The process comprises a step b) of pre-isolation during which an isolation block is disposed in a vacant space intended to receive the technical elements of the building.

The process comprises a pouring step c) during which the concrete of the concrete structure of the building is poured around the isolation block so as to trap at least the lateral surfaces of the block in the concrete. The lateral surfaces are the surfaces of the isolation block perpendicular to the plane of the concrete structure of the building.

The process comprises a step d) of opening up the isolation block during which the isolation block is perforated. The perforation is preferably effected in a central part so as to leave a substantial volume of the isolation block between the concrete structure and the technical elements that have to be integrated.

The process comprises a step e) of installation of technical elements in or through the opening in the isolation block.

The process may further comprise a step a) of disposing reinforcing bars to construct the concrete structure of the building. This is effected so as to leave at least one vacant space in which the isolation block is placed during the pre-isolation step b). The step a) of disposing reinforcing bars, although it may be effected before positioning the isolation block, is preferably effected after the disposition of the isolation block.

Where appropriate, the isolation block is disposed so as to come into contact with the reinforcing bars or to be interconnected with the end of the reinforcing bars disposed during the first step a). If the disposition of the reinforcing bars is effected after the disposition of the isolation block the reinforcing bars are disposed in such a manner as to come into contact with the isolation block or to be interconnected therewith. The isolation block may include one or more lateral openings or recesses to enable the passage of reinforcing bars.

The pouring step c) may be effected so that the visible surface of the isolation block installed during the second step b) is flush with the surface of the concrete structure once poured or so as partly or totally to cover the visible surface of the isolation block, or to leave part of the isolation block projecting from the surface of the concrete structure once poured. The visible surface is the surface of the isolation block parallel to the plane of the concrete structure. It is consequently orthogonal to the lateral surfaces.

The opening up step d) is preferably effected by hand or with the aid of manual tools such as a knife, trowel or the like.

A sixth step f) of impermeabilization may follow the steps described above. The process is then effected in accordance with the sequence: first step a), second step b), third step c), fourth step d) and fifth step e), effected in a chronological manner in that order. The first step a) and the second step b) may be interchanged.

The subject matter of the present invention is also an isolation block comprising an easily modelled fire retardant material or consisting of an easily modelled fire retardant material, optionally covered with a layer of impermeable material. The isolation block is adapted to be incorporated in a concrete structure of a building. The fire retardant material is preferably selected from compacted glass wool or rockwool. Its density is preferably equal to or greater than 150 kg/m$^3$. The isolation block may be totally or partly covered with an intumescent paint.

The subject matter of the present invention further comprises any concrete structure comprising at least one isolation block as described hereinabove. The concrete structure may be the concrete framework of a building or any concrete element intended to be integrated into the concrete framework of the building during its construction and adapted to be assembled to the rest of the building before opening up the isolation block and installing the technical elements to be protected.

BRIEF DESCRIPTION OF THE FIGURES

Embodiments of the invention are indicated in the description illustrated by the appended figures.

EMBODIMENT(S) OF THE INVENTION

Figure 1:
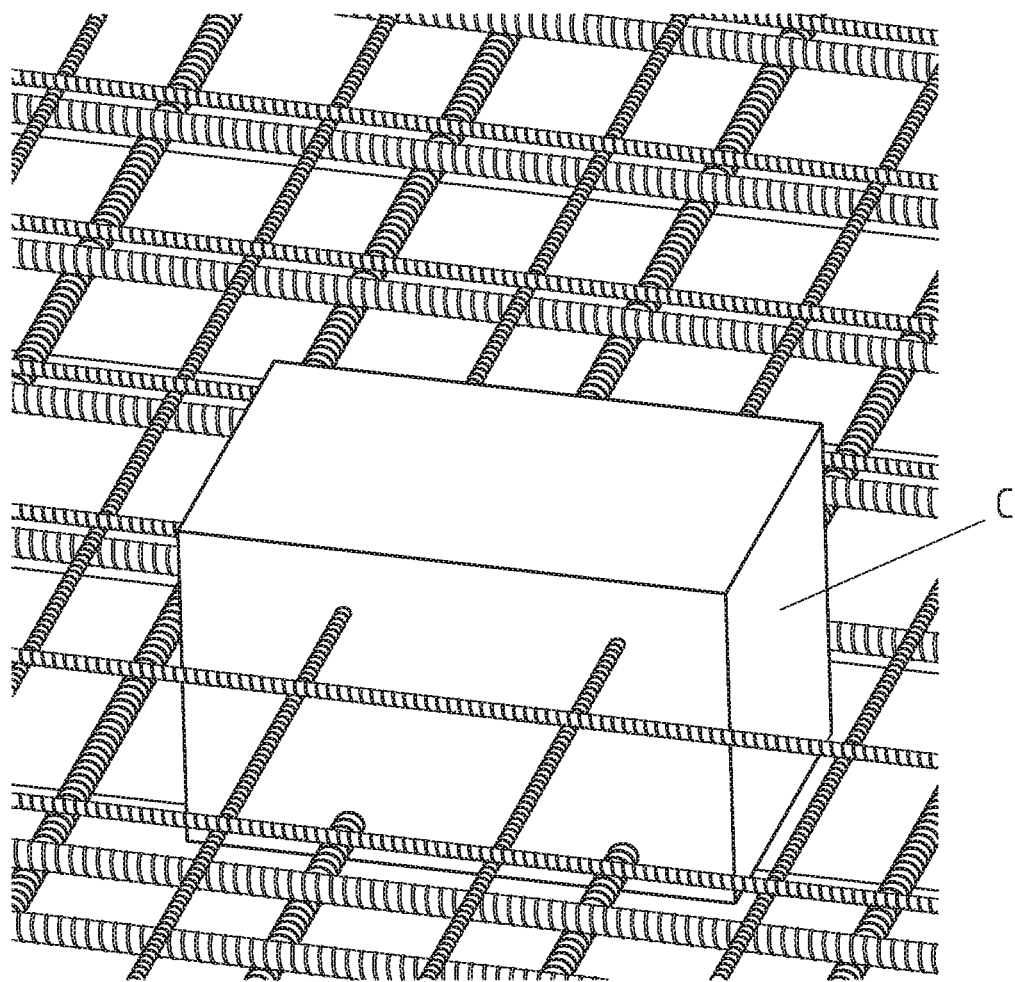
FIG. 1: isolation block disposed before pouring the concrete.
Figure 2:
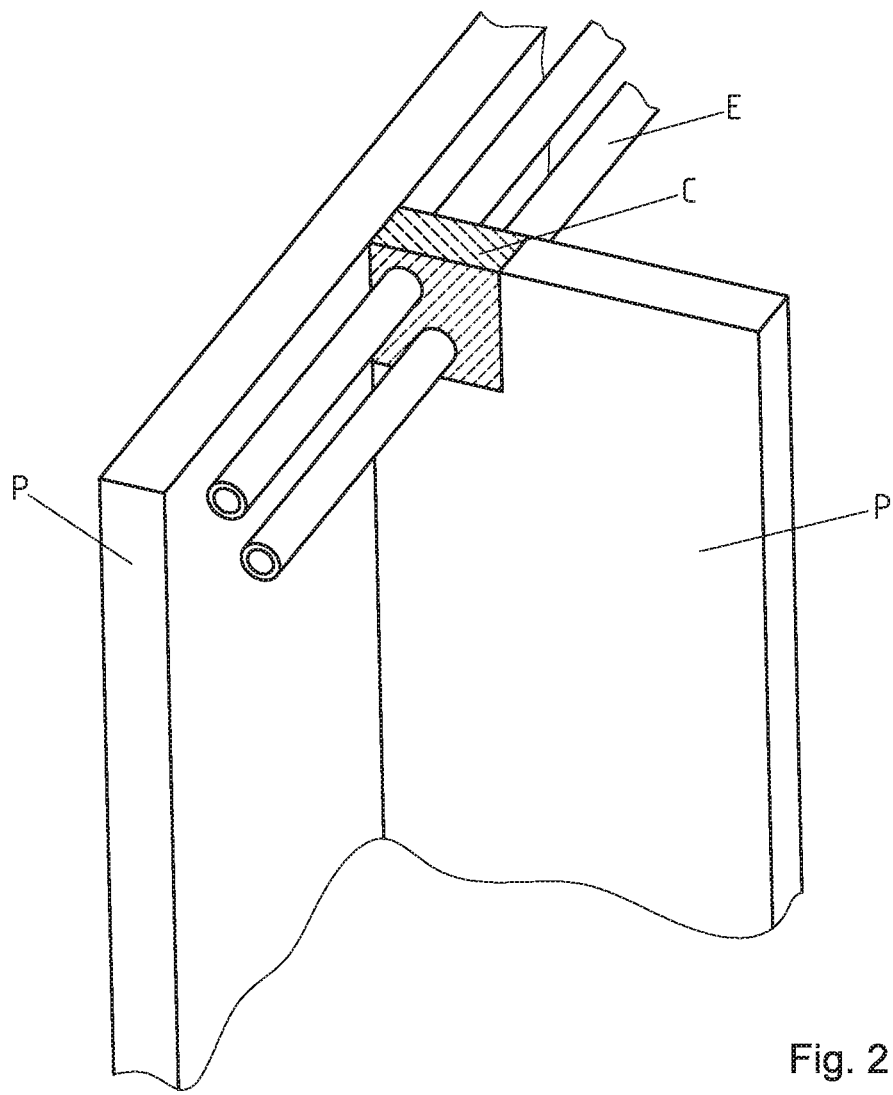
FIG. 2: diagrammatic view of an isolation block integrated into the structure of the building.

The present invention relates to a thermal isolation block C intended to protect from fire the technical elements of a building. The isolation block C comprises in particular a fire retardant material resistant to fire for at least 30 minutes, or even 60 minutes, or even 90 minutes or more. The fire resistance it determined according to the provisions of the AEAI standard in force.

The isolation block C is a block consisting of a fire retardant material C1 such as rockwool or harder material. The isolation block C used for the requirements of the invention preferably consists of an easy to model material so as to be able to open it up and to insert the technical elements of the building. Rockwool is an RF1 material, as defined in the fire protection directive "construction elements and materials" currently in force and is particularly suitable for this. Such materials can be compacted in such a manner as to retain a rigid and proper shape. RF1 materials are defined as having no contribution to the fire.

The expression "easy to model" denotes a material that can be worked by hand or with a hand tool such as a knife or a trowel or the like. A material of this kind makes it possible to dispense with heavy and bulky equipment such as picks and electrical or pneumatic drills. A material of this kind further enables time to be saved in the placement of technical elements E.

The isolation block C assumes the dimensions necessary for the placement of the technical elements E of the building. It may for example take the form of a cube or of a rectangular parallelepiped with a thickness of the order of 20 cm, 30 cm, 50 cm or more. The width is adapted to suit the technical elements E to be incorporated in the building during its construction. A width of a few tens of centimetres may be sufficient. The width may be up to 1 m, 2 m, 3 m or more as a function of the dimensions of the technical elements. The length can be adapted in the same proportions, i.e. from the order of a few tens of centimetres to 1 m or 2 m or 3 m or more.

The technical elements E consist of any installation to be integrated into the building during its construction. They include heating networks, sanitation networks, polyvinylchloride (PVC) pipes or polyethylene (PE) pipes, ventilation ducts, ventilation blocks, electrical boxes, electrical cable ducts, surveillance devices integrated into the structure of the building, including where appropriate devices for surveillance of the integrity of the building, communication devices and their connections, air conditioning or heating devices.

The isolation block C may be covered with a layer C2 of material impermeable to water so as to protect the fire retardant material from moisture, in particular during its warehouse storage or its transportation. The layer C2 impermeable to water may be a layer of aluminium or a layer of a polymer such as a plastic material or a mixture of a plurality of layers of different materials. The layer C2 impermeable to water may for example consist of a first layer of a cardboard covered material to confer on it the stiffness necessary to support it and an impermeable second layer of aluminium or plastic. It may for example be of the TétraPack® type including a layer of cardboard resistant to water one or both sides of which are covered with a polymer such as polyethylene, and comprising a layer of aluminium, possibly abutting a layer of a polymer such as polyethylene. The layer C2 impermeable to water may be a layer of an elastomer such as rubber or a thermoplastic.

The isolation block C is intended to be disposed in the concrete structure P of the building. It may for example be disposed between two parts of the building under construction, such as two storeys or two rooms that are contiguous, before pouring the concrete. In this way the isolation block C finds itself integrated into the structure of the building P at locations identified beforehand during the design of the building. For the purposes of the present invention the concrete structure P of the building is any structural element made of concrete. The concrete structure P therefore includes any vertical wall, any horizontal slab or horizontal floor, all prefabricated structures incorporated into the building during its construction.

In this instance the isolation block C may be integrated into the metal armature comprising the reinforcing bars at the location where the technical elements E of the building will be disposed.

When the concrete is poured the isolation block C is preferably still visible and accessible so that it can be opened up in the proportions necessary for the installation of the technical elements E. The isolation block C is therefore sized to be flush with the surface of the finished concrete structure P. Alternatively, the isolation block C is sized so as to project a few centimetres, of the order of 1, 2, 5 or 10 cm or 15 cm or more, on the surface of the finished concrete structure P in such a manner as to compensate the thickness of any covering on the surface of the concrete structure P. On a vertical wall a covering of this kind may for example comprise a layer of thermal isolation disposed for energy saving purposes.

Alternatively, the isolation block C may be sized in such a manner as to remain set back relative to the surface of the concrete structure P. Under these conditions when it is poured the isolation block C is covered with a small thickness of concrete, of the order of 1, 2, 5 or 10 cm. The layer of concrete covering the isolation block C may however be easily broken afterwards, because of its thinness and therefore its low strength. Once the concrete covering the isolation block C has been eliminated, the space may be exploited to dispose on the isolation block C a layer of materials impermeable to water to seal the assembly of the isolation block to the structure of the building. Alternatively or additionally, a decorative or trim material may be disposed therein. The thickness of the material added in this way may be defined so as to be flush with the surface of the concrete structure P.

The isolation block C enables for example a cut-out between two storeys to enable the passage of vertical technical ducts that extend along the concrete structure P of a building over its full height or over a substantial portion of its height. The thickness of the isolation block C may be determined so as to correspond to the thickness of the concrete slab once poured. It follows that the isolation block C is still visible after the slab separating the two storeys is poured. It may then be opened up to enable the passage of the technical ducts from one storey to the other.

The same principle is applicable for the vertical walls, which must be cut out to enable the passage of technical elements on either side of these walls.

The isolation block C is preferably sufficiently rigid to retain its shape despite the pressures exerted by the liquid concrete when it is poured. The density of the isolation block C when it is made of rockwool is preferably at least 150 kg/m³. The density may nevertheless be greater than this as a function of what is required or of the material used in the manufacture of the isolation block C.

The isolation block C is moreover sufficiently strong to support a person. In other words, the isolation block C once incorporated in a concrete slab for example allows workers to walk over it in complete safety with no risk of them falling to the lower level.

The isolation block C may optionally be covered with a rigid material such as a hard plastic or a cardboard covered material. Additionally or alternatively the isolation block C may comprise within its mass rigid reinforcements such as reinforcing bars. Such reinforcements may be integrated into the isolation block C and close to its surface in such a manner as not to impede the installation of the technical elements. Such reinforcements may for example be made of a plastic material sufficiently rigid to support the weight of a man. Where appropriate, the reinforcements of the isolation block C must be able to be modelled or removed for the possible passage of the technical elements. They can be cut or broken easily. PVC reinforcements may for example fulfil this role.

The isolation block C advantageously makes it possible to dispense with the steps of installing and removing formwork usually practiced in the construction of a building. To this end, the isolation block C may be precut to measure and if necessary modified in situ and disposed before pouring the concrete of the structure P.

One or more surfaces of the isolation block C may comprise asperities in such a manner as to anchor the isolation block C in the concrete structure P of the building. The surfaces intended to be in contact with the concrete structure P may more particularly be provided with one or more protrusions that may be conical, rectangular or of various shapes, intended to be embedded in the concrete of the structure P. In this manner the isolation block C cannot be removed or moved after the concrete structure P is poured. Alternatively or additionally one or more of the surfaces of the isolation block C are none-plane so as to enable anchoring of the isolation block C in the concrete structure P. The surfaces of the isolation block C may for example be striated or in the shape of waves.

Alternatively, the isolation block C is disposed so as to be partly penetrated by one or more reinforcing bars of the concrete structure P. Accordingly, the isolation block C is placed in a non-removable manner before pouring the concrete structure P around the reinforcing bars. Once the concrete structure has been poured, the isolation block C is immobilized by the ends of the reinforcing bars and cannot be removed or moved. The reinforcing bars may for example be incorporated in the isolation block C over a length of a few centimetres, of the order of 1, 2, 5 cm or more.

Alternatively, independent anchoring systems, such as fixing bars or other rigid rods that can be inserted into the isolation block C over a length of a few centimetres, of the order of 1, 2, 5 cm or more, at the time of its installation, may be envisaged.

Figure 3:
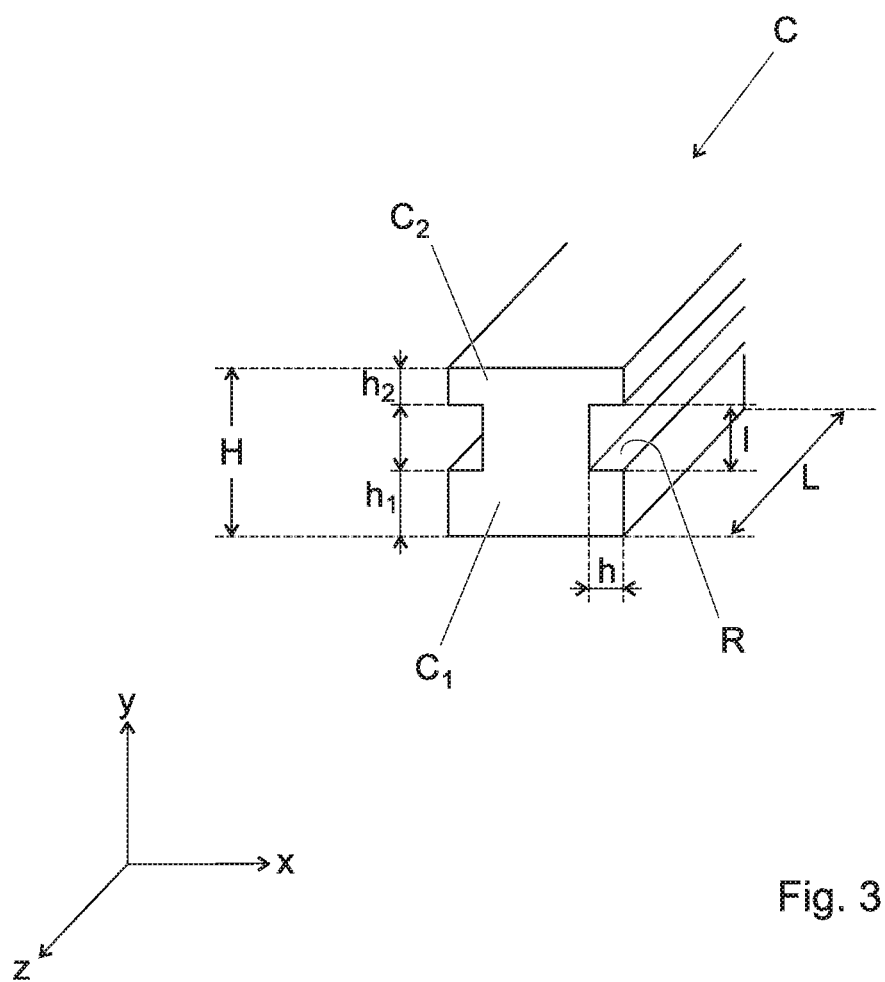
FIG. 3: diagrammatic view of an isolation block in accordance with one embodiment.

Alternatively, the isolation block C includes one or more rectilinear recesses through one or more of its faces in such a manner as to enable the passage of one or more reinforcing bars. FIG. 3 shows an example of one such arrangement. According to this particular disposition, the isolation block C may include a rectilinear recess R passing through two of its opposite lateral faces over all their length L. The depth of these recesses R is of the order of a few centimetres and may depend on the diameter of the reinforcing bars used. The depth h of the recesses R may for example be between 2 and 10 centimetres inclusive, preferably between 3 and 8 cm inclusive, or of the order of approximately 5 cm. The width l of the recess R may be equal to or different from its depth h. The width l is preferably greater than its depth h. The width l of the recesses R is for example between 8 and 15 cm inclusive, preferably of the order of approximately 10 cm. The recesses R may be centred on the lateral faces of the isolation block C. They are preferably off-centre, either toward the upper half or toward the lower half of the isolation block C, so that the lower and upper lateral surfaces of the isolation block C that bracket the recesses R are not equal. In other words, the heights h1 of the lower lateral surface and h2 of the upper lateral surface which bracket the recess R on one lateral face of the isolation block C of total height H are different. According to one particular embodiment, the height h1 of a lower lateral surface is of the order of 12 cm and the height h2 of an upper lateral surface is of the order of 8 cm. According to one particular disposition, the height h2 defined by an upper lateral surface corresponds to the thickness of the impermeable layer C2 of the isolation block C. The impermeable layer C2 is disposed on the upper surface of the isolation block C. The terms upper, lower, lateral denote parts of the isolation block C according to their usual sense when the isolation block C is oriented as in FIG. 3.

According to another aspect of the invention, the isolation block C may be integrated into an element of the concrete structure P prefabricated in a factory. For example, walls or slab elements may be prepared with one or more isolation blocks C and then transported to the site to be integrated into the rest of the building.

The isolation block C may be made from rockwool, also known as stone wool, in powder or previously extruded form and them compacted. One or more additives may be included, in particular to facilitate cohesion of the raw material during pressing. Possible additives include glues and hydrophobic materials.

The present invention further covers a process of isolating the technical elements E against fire.

The process comprises a first step a) during which reinforcing bars of a concrete structure P are put in position. The reinforcing bars of the structure P are disposed so as to leave at least one vacant space with no reinforcing bars. The location and the dimensions of this vacant space may be predetermined during the design of the building. The location and the dimensions of this vacant space may alternatively be determined in situ. This step of disposing the reinforcing bars may nevertheless be optional. If reinforcing bars are not necessary, the process commences with the step b).

The process comprises a second, pre-isolation step b) during which an isolation block C as described hereinabove is disposed in the vacant space produced during the step a). The isolation block C may be disposed in such a manner as not to be in contact with or associated with the reinforcing bars of the structure P. Alternatively, the isolation block C may be disposed in such a manner as to be in close contact with the reinforcing bars, or even interconnected with the ends of the reinforcing bars, over a distance of a few centimetres, of the order of 1, 2, 5 cm or more. If the step a) is not required, the isolation block C may be retained by any other fixing means such as fixing lugs screwed or nailed to a support structure.

The process comprises a third, pouring step c) during which the concrete is poured to form the concrete structure P of the building. The concrete is poured in such a manner as to come into contact with the isolation block C the surfaces of which serve as formwork. The concrete of the concrete structure P may be poured in such a manner as to be flush with the visible surface of the isolation block C. Alternatively, the concrete may be poured in such a manner as to cover the isolation block C partly or totally. As a function of what is required, the concrete of the concrete structure P may be poured in such a manner as to allow a visible surface of the isolation block C to project, which then forms a step relative to the surface of the concrete structure P when poured.

The process comprises a fourth step d) of opening up the isolation block C. The isolation block C is perforated, preferably in its central part, within the dimensions that correspond to the dimensions of the technical element E or of the technical elements E to be incorporated. Opening up is effected with bare hands or with the aid of manual tools such as trowels, knives, possibly chisels. The opening up of the isolation block C preferably does not necessitate any mechanized tool. If the isolation block C is covered by a layer of concrete during the step c), the opening up step d) comprises the destruction of this layer of concrete. The layer of concrete may preferably be destroyed without using mechanized tools, but with the aid of manual tools such as hammers, mallets, possibly chisels. If the isolation block includes a layer C2 impermeable to water the opening up step comprises the destruction of this layer C2 of impermeable material. If the isolation block C comprises one or more reinforcements, the step of opening up the isolation block C may comprise the destruction of one or more of these reinforcements. These reinforcements may preferably be easy to destroy by hand or with the aid of manual tools such as chisels or saws. The dimensions of the opening in the isolation block C correspond to those of the technical elements E to be incorporated, possibly augmented by a clearance necessary for the installation of these technical elements E. The clearance may be of the order of a few millimetres or a few centimetres as a function of the size and the shape of the technical elements E to be incorporated.

If the concrete structure P is a prefabricated structure that has to be integrated into a construction in progress, a step c2) of assembling the concrete structure P to the rest of the building must take place before the step d) of opening up the isolation block.

The process comprises a fifth step e) of placing the technical elements E in the isolation block C. The technical elements E are those listed hereinabove. The list is not exhaustive however. It is to be understood that any element intended for the operation and the integrity of the building and having to be the subject of fire retardant protection may be considered a technical element E for the purposes of the present invention. The technical elements E further comprise any accessories such as layers of thermal isolation to prevent condensation, reinforcing structures, cladding elements. The technical element or elements E are disposed in the opening produced during the fourth step d).

The process may comprise a sixth, impermeabilization step f) in such a manner as to render watertight the assembly of the isolation block C with the concrete structure P. This step f) is not obligatory. It is in particular superfluous in internal parts of the building. It may however prove necessary for external parts of the building, in particular where the roof and the outside walls are concerned. The impermeabilization step f) may comprise the sprinkling, dispersion or insertion into the intercalary spaces of an impermeable material such as a silicone mastic. Alternatively or additionally the impermeabilization may be effected with the aid of tar paper, expanded foam or any other means usual in the context of property construction.

According to the process of the present invention, the steps a), b), c), d), e) and f) described hereinabove are carried out in the order described. According to a preferred variant, the steps b), a), c), d), e) and f) described hereinabove are effected in that order.

REFERENCE NUMBERS EMPLOYED IN THE FIGURES

C Isolation block
C1 Fire retardant material
C2 Layer of material impermeable to water
E Technical elements
P Concrete structure of the building
L Length of the isolation block
R Recess
l Width of the recess
H Height of the isolation block
h Depth of the recess
h1 Height of the lower lateral face of the isolation block
h2 Height of the upper lateral face of the isolation block

The invention claimed is:

1. Isolation block adapted to manage a free space in concrete when poured, comprising a fire retardant material having a density equal to or greater than 150 kg/m$^3$, which is compacted in such a manner to retain a rigid and proper shape despite the pressure exerted by the concrete when it is poured, said isolation block having two opposite lateral faces and being adapted to be perforated by hand or with a hand tool, said fire-retardant material being an RF1 material having no contribution to fire and being resistant to fire for 90 minutes or more, whereby said isolation block is integrated into a resulting concrete structure at a location identified before the concrete is poured, wherein said two lateral faces comprise asperities adapted to anchor the isolation block in the concrete structure of the building, said asperities being a rectilinear recess passing through two of said opposite lateral faces over all their length.

2. Isolation block according to claim 1, wherein said recesses are off centre, either toward the upper half or toward the lower half of the isolation block, so that the lower and upper lateral surfaces of the isolation block that bracket the recesses are not equal.

3. Isolation block according to claim 1, further comprising a layer of impermeable material, said layer of impermeable material being adapted to be perforated by hand or with hand tools.

4. Isolation block according to claim 1, said isolation block being precut to be modified in situ.

5. Isolation block according to claim 1, further comprising rigid reinforcements integrated into said isolation block and arranged close to its surface, said reinforcements being adapted to be broken by hand or with hand tools.

6. Isolation block according to claim 1, said isolation block being covered with a rigid material.

7. Isolation block of claim 6, wherein the rigid material comprises a hard plastic or a cardboard material.

8. Isolation block according to claim 1, further comprising one or more additives which facilitate cohesion of the isolation block.

9. Isolation block according to claim 1, wherein the fire resistant material is selected from compacted glass wool or rockwool.

10. Concrete structure (P) comprising one or more isolation blocks (C) as described in claim 1.

11. Concrete structure according to claim 10, wherein said one or more blocks are still visible and accessible.

12. Concrete structure according to claim 10, wherein the thickness of said one or more blocs corresponds to the thickness of the concrete once poured.

13. Concrete structure according to claim 10, said one or more blocks comprising an impermeable layer and wherein said recesses is off-center so that the upper and lower lateral surfaces that bracket the recesses are not equal and wherein the upper lateral surface corresponds to the thickness of the impermeable layer.

* * * * *